Oct. 5, 1943. F. W. DURGIN 2,331,112
AIRPLANE CARRIER AND APPARATUS FOR LAUNCHING AIRPLANES THEREFROM
Filed Sept. 24, 1941
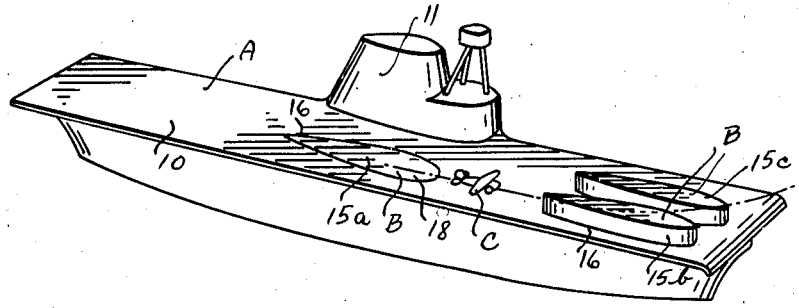
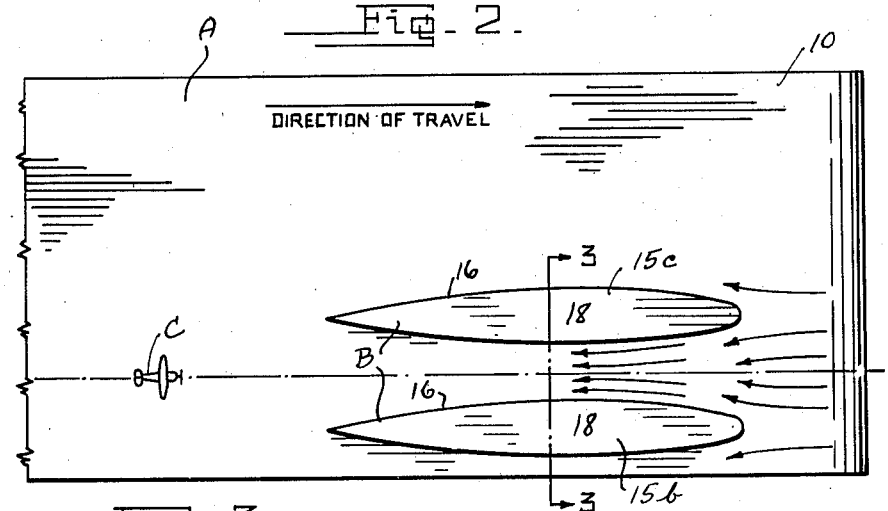
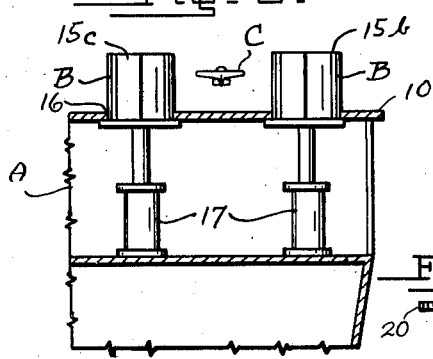
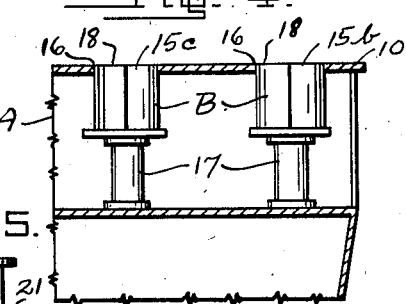
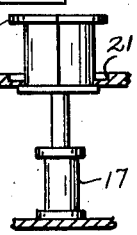
INVENTOR.
Franklin W. Durgin Patented Oct. 5, 1943

2,331,112

UNITED STATES PATENT OFFICE 2,331,112

AIRPLANE CARRIER AND APPARATUS FOR LAUNCHING AIRPLANES THEREFROM

Franklin W. Durgin, Washington, D. C.

Application September 24, 1941, Serial No. 412,172

6 Claims. (Cl. 114—43.5)

This invention relates to improvements in airplane carriers and apparatus for assisting in the launching of an airplane from the deck of a moving ship.

Aircraft carriers, if made of a length sufficient to permit the launching of heavily loaded bombers and high speed fighters, are more vulnerable to aerial and submarine bombs and torpedoes and are less maneuverable than shorter boats. The primary object of the present invention is to provide means whereby heavily loaded or high speed planes may be launched over runways of reduced length so that relatively short boats may be employed as aircraft carriers.

An important object of the invention is to provide means for increasing the velocity of the airstream produced along the runway of a moving airplane carrier whereby to provide additional lift for an airplane taking off from the runway.

Another object of the invention is to provide apparatus for the purpose described which will not materially increase the resistance of the air to forward travel of the airplane carrier.

A further object of the invention is the provision of apparatus as described which may be readily shifted between operative and inoperative positions.

The invention also aims to provide apparatus of the character described which, when disposed in an inoperative position, will not decrease the useful area of the carrier deck.

The invention further aims to provide means co-acting with a portion of the carrier superstructure during forward travel of the carrier to constrict the airstream passing over the deck of the carrier whereby to increase its velocity.

Other objects and advantages of the invention will become apparent during the course of the following detailed description, taken in connection with the accompanying drawing, forming a part of this specification, and in which drawing, Figure 1 is a perspective view of an aircraft carrier equipped with my improved apparatus.

Figure 2 is a fragmentary top plan view of the forward end portion of the aircraft carrier.

Figure 3 is a fragmentary transverse sectional view of the carrier substantially on the line 3—3 of Figure 2 and showing the apparatus in its operative position.

Figure 4 is a view similar to Figure 3 but showing the apparatus in its inoperative position.

Figure 5 is a fragmentary transverse sectional view showing a modified form of construction.

In the drawing, which shows preferred and modified forms of the invention, and wherein similar reference characters denote corresponding parts throughout the several views, the letter A generally designates an aircraft carrier equipped with apparatus B for facilitating the launching of an airplane C from the carrier.

The aircraft carrier A includes an upper deck 10 providing longitudinal runway areas extending in the direction of normal travel of the carrier A. Disposed along one side of the deck 10 intermediate its ends is an airfoil 11 which may constitute a streamlined enclosure for certain portions of the carrier superstructure, such as the smokestack, whereby the major portion of the deck remains unobstructed.

Referring now to the apparatus B, the same comprises airfoils 15a, 15b, 15c vertically movable through openings 16 in the deck between elevated and lowered positions, as by suitable servo-motors 17 beneath the deck 10.

In their lowered positions, these airfoils 15a, 15b, 15c, are disposed so that their flat tops 18 are substantially flush with the deck 10 whereby to not decrease the useful area of the deck.

In their elevated positions, the airfoils 15a, 15b, 15c, project above the level of the deck 10 but will not appreciably interfere with forward travel of the carrier due to their symmetrical streamlined contour.

The airfoil 15a is arranged in spaced parallel relation to the stationary airfoil 11 and coacts therewith to constrict a portion of the airstream produced by forward travel of the carrier.

Similarly, the airfoil 15b is disposed in spaced parallel relation to the airfoil 15c and cooperates therewith to inwardly deflect the airstream toward the middle of the runway that extends therebetween. The space between companion airfoils is free from overhead obstructions and in communication with the sky throughout the length of the airfoils.

During forward travel of the carrier, a portion of the airstream moving thereover will pass between the companion airfoils 15b, 15c which, as shown in the drawing, are convergent intermediate their leading and trailing edges in a manner resembling the convergency of the sides of a venturi. The airstream transversely constricted between the companion airfoils will tend to rise and spill over the tops of the airfoils, whereby to further increase the lifting action of the airstream on a plane traveling thereinto.

If desired, the airfoils may be provided at their upper end portions each with a horizontal flange 20, as shown in Figure 5, thereby tending to prevent vertical escape of the airstream passing therebetween. Upon lowering of the airfoil to its inoperative position, the flange 20 will be accommodated in a recess 21 in the deck.

In the utilization of the invention, the airplane carrier A is propelled, preferably in a direction opposite to that of the wind, and the airplane C, starting from a suitably remote point, is driven down the runway between companion airfoils, the airplane controls being manipulated to elevate the airplane as the constricted portion of the airstream is reached. The relatively high velocity of the airstream and its tendency to escape from the space between companion airfoils by upward flow will tend to facilitate the launching of relatively heavy airplanes from the carrier deck.

Various changes may be made in the forms of invention herein shown and described without departing from the spirit of the invention or the scope of the following claims.

I claim:

1. The combination with an aircraft carrier including a deck providing an open runway extending in the direction of travel of the carrier so that movement of the carrier will produce an airstream longitudinally of the runway, of streamlined airfoils at opposite sides of the runway for transversely constricting said airstream intermediate the ends of the runway, the space between said airfoils being free from overhead obstructions whereby said transversely constricted airstream will tend to rise upwardly from the deck and whereby an airplane may take off and climb in said transversely constricted airstream.

2. An aircraft carrier including a deck providing an open longitudinal runway, and streamlined airfoils extending along opposite sides of the runway, said airfoils projecting upwardly from the deck and including sides shaped to increase the velocity of the wind relative to the runway during forward travel of the carrier, the space between said airfoils being free from overhead obstructions to permit climbing of an airplane therefrom.

3. An aircraft carrier including a deck providing a longitudinal runway, said deck being provided with elongate openings extending along opposite sides of the runway, airfoils vertically movable in said openings, means for moving said airfoils between elevated and lowered positions, said airfoils including sides shaped to increase the velocity of the wind relative to the runway during forward travel of the carrier when said airfoils are in their elevated positions, and including tops substantially flush with the deck when said airfoils are in their lowered positions.

4. An aircraft carrier including a deck providing an open longitudinal runway, and streamlined airfoils extending along opposite sides of the runway, said airfoils projecting upwardly from the deck and including sides extending in convergent relation from the leading edges of said airfoils whereby to reduce the width of the runway in a zone intermediate the leading and trailing edges of the airfoils so as to increase the velocity of the wind relative to the runway at said zone during forward travel of the carrier, the space between said airfoils being free from overhead obstructions.

5. An aircraft carrier including a deck providing a longitudinal runway, and streamlined airfoils extending along opposite sides of the runway, said airfoils projecting upwardly from the deck and including inner sides shaped to increase the velocity of the wind therebetween during forward travel of the carrier, the inner and outer sides of said airfoils being symmetrical whereby to reduce turbulence along the runway.

6. In an aircraft carrier, a deck providing a longitudinal runway and having an airfoil along one side of the runway and an elongate opening along the other side of the runway, an auxiliary airfoil vertically movable in said elongate opening, means for moving said auxiliary airfoil between elevated and lowered positions, said airfoils including sides shaped to increase the velocity of the wind relative to the runway during forward travel of the carrier when said auxiliary airfoil is in its elevated position, and said auxiliary airfoil including a top substantially flush with the deck when said auxiliary airfoil is in its lowered position.

FRANKLIN W. DURGIN.